March 22, 1932.  A. B. SAUNDERS  1,850,308
METHOD AND APPARATUS FOR MIXING ASBESTOS FIBERS AND CEMENT
Filed Sept. 25, 1929
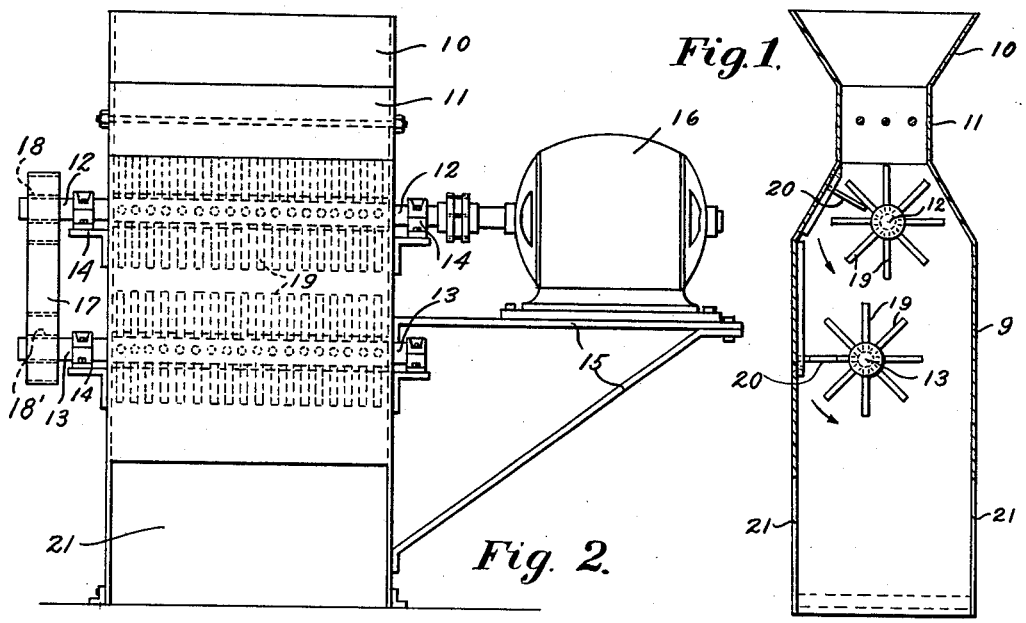
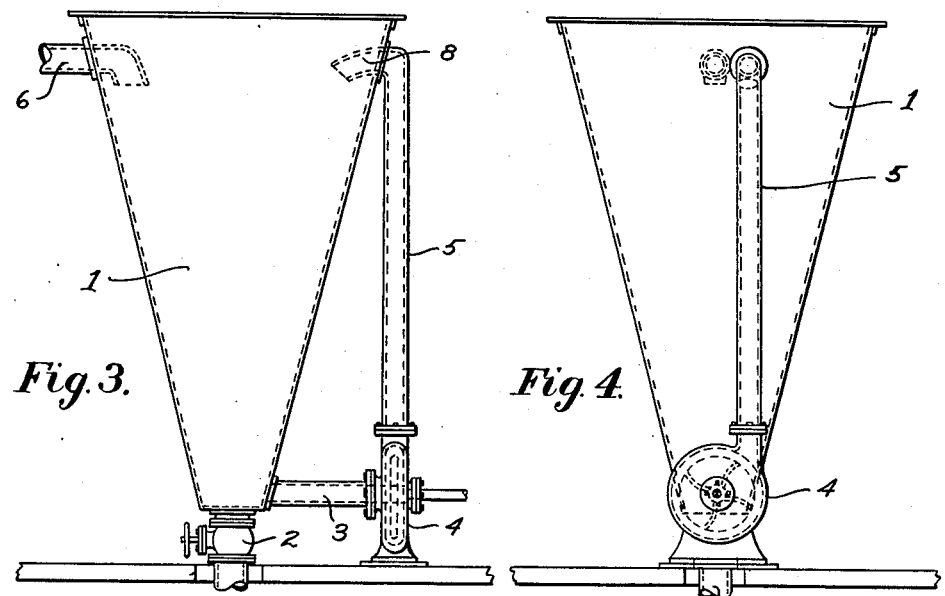
Inventor
Arthur B. Saunders.
by Roberts, Cushman and Woodbury
Att'ys.

Patented Mar. 22, 1932

1,850,308

UNITED STATES PATENT OFFICE

ARTHUR B. SAUNDERS, OF NASHUA, NEW HAMPSHIRE, ASSIGNOR TO JOHNS-MANVILLE CORPORATION, OF NEW YORK, N. Y., A CORPORATION OF NEW YORK

METHOD AND APPARATUS FOR MIXING ASBESTOS FIBERS AND CEMENT

Application filed September 25, 1929. Serial No. 395,057.

One object of this invention is to provide a method and apparatus for mixing asbestos fibers and hydraulic cement in the presence of water and obtaining therefrom a homogeneous mixture of fibers and cement particles in the form of a wet mush or pulp which may be formed into sheets or slabs of refractory material.

Another object of this invention resides in the treatment of waste scrap so that it can be mixed with dry hydraulic cement in the presence of water to form the wet mush or pulp above mentioned.

A further object of this invention resides in the treatment of the asbestos fiber and dry cement whereby the caking or balling of the cement is prevented and the small particles thereof are each coated with moisture.

Heretofore it has not been thought possible to form a wet mush or pulp by mixing asbestos fiber and cement and to prevent the cement from caking or balling so that the mixture will be homogeneous. For this reason the general practice at the present time has been to make a dry or pasty mixture of the asbestos fiber and cement, shape or mold the mixture in this condition, and add water thereto later. While such practices attain the desired homogeneous mixture, they are open to other objections which the use of the fluid wet mush or pulp avoids.

Moreover, difficulty has been experienced in reusing the waste scrap from sheets or slabs of refractory material due to the fact that the fibers of the asbestos are coated with cement grit or dust which interferes with the proper mixing of the fibers with cement in the procedure followed prior to my invention.

My invention in its broadest aspects is characterized by the formation in a suitable container of a mixture of asbestos fiber and water, the mixture being kept in a constant state of agitation so that the fibers are in suspension in the water, and the successive addition thereto of dry cement in small quantities while continuing the agitation. The separate particles of cement are completely covered with water and mixed with the asbestos fiber so that the mash or pulp when drawn from the container may be handled in substantially the same manner as paper pulp.

The waste scraps are disintegrated and pulverized dry and then placed in the container, which is partially filled with water. Agitation of the water and fibers is then set up by drawing the liquid from the bottom of the container and returning it thereto in a stream which strikes down upon the surface of the mixture in the container at an angle, thereby setting up an eddy or whirlpool movement in the container. The agitation so created in the liquid mixture prevents the asbestos fibers from settling and forces them to spread through the water so that they are in complete suspension.

The cement is dusted upon the surface of the mixture while the latter is being agitated, as pointed out above. Thus the cement particles are substantially independent of each other during their passage through the air, and when they touch the surface of the agitated mixture the particles are quickly and completely coated with water. Thus it might be said that the cement particles are first in air suspension and then in water suspension. The coating of water upon the particles prevents them from caking or balling and the continuance of the agitation causes the suspended cement particles and suspended asbestos fibers to be intermixed homogeneously.

The accompanying drawings illustrate one form of apparatus wherein and whereby the above-described operation may be carried out.

In the drawings:

Fig. 1 is a vertical transverse section; and
Fig. 2 a front elevation of the disintegrators;
Fig. 3 is a front elevation; and
Fig. 4 a side elevation of the mixer.

The disintegrator as shown in Figs. 1 and 2, comprises a casing 9, preferably rectangular in cross section having at its upper end a hopper 10 and a feeding neck 11. Extending across the feeding neck 11 are suitably spaced rods, which prevent the operator from inserting a hand into the body of the casing. Within the body of the casing 9 below the neck 11 are mounted shafts 12 and 13, one beneath the other. The ends of the shafts project beyond opposite sides of the casing 9 and are journaled in bearings 14 suitably supported on brackets fixed to the walls of the casing. Secured on the portions of the shafts 12 and 13 within the casing are a plurality of longitudinally spaced rows of radially disposed steel pins 19. The rows of pins 19 are suitably spaced so that the pins pass between stationary pins 20 placed in rows on the inner wall of the casing, see particularly Fig. 1. The shafts 12 and 13 are rapidly rotated in the direction indicated by the arrows in Fig. 1 by means of an electric motor 16 supported on brackets 15 fixed outside the casing. The shaft of the motor is directly connected with one end of the shaft 12. The other end of the shaft 12 is provided with a pulley 18 by which motion is transmitted to the shaft 13 through a belt 17 and a pulley 18' fixed on the shaft 13.

The interaction of the pins 19 and 20 disintegrates and pulverizes the scraps of asbestos and cement fed into the casing 9 through the hopper 10 and neck 11. The disintegrated and pulverized material drops to the bottom of the casing 9 from which it is removed, openings 21 being provided at either side of the casing through which the material may be taken away. However, the casing 9 may be located directly over the mixer about to be described so that the disintegrated material will drop directly into it.

The mixer in which the product of the first machine is further treated comprises a tank 1 of conical form suitably supported with the small end downward, as shown in Figs. 3 and 4. Extending from the bottom of the tank 1 is a discharge outlet 7 which is controlled by a valve 2 of any desired form. A pipe 3 connects the bottom part of the tank with the suction side of a centrifugal pump 4 which is rotated by any suitable means (not shown). Connected to the blower side of the pump is a pipe 5 which enters the upper part of the tank, terminating in a nozzle 8 within the tank. The pipes 3 and 5 are preferably of corresponding diameters. A pipe 6 entering the upper end of the tank supplies water thereto.

The operation of the mixer is as follows: The product of the first machine is introduced into the tank 1, which is about three-quarters filled with water, and the pump 4 set in motion. The asbestos and water are thoroughly mixed, both by the action of the pump 4 and also by the whirling motion which is created within the tank by reason of the direction at which the stream issuing from the nozzle 8 strikes the mixture in the tank. This movement of the mixture causes a further shredding of the asbestos fibers previously disintegrated by the first machine and the suspension of the fibers in the water. After the operation has continued for a short time, coarse asbestos fiber is introduced and the operation continued until all the asbestos has been thoroughly distributed through the water and has been completely shredded. Dry cement is then fed into the tank and the agitation is continued until the mixture of the cement and shredded asbestos is entirely homogeneous. The valve 2 which has heretofore been closed is now opened and the wet mash or pulp drawn from the tank and further treated in the manufacture of shingles or sheets. The pulp thus formed is particularly adapted for fabrication into sheets on a suitable type of cardboard machine.

The particular embodiment of the apparatus herein described and shown was selected for the purpose of illustration only and my invention is not limited to the particular features and functions thereof since other embodiments might be made to carry out the invention without departing from the spirit and scope thereof as set forth in the following claims.

I claim:

1. Method of making pulp containing asbestos and cement characterized by the following steps, disintegrating the waste scrap resulting from the manufacture of sheets and shingles of asbestos and cement, shredding the disintegrated material in water, adding coarse asbestos fiber to the shredded material, feeding dry cement to the shredded asbestos, rapidly agitating the mass so that the mixture is entirely homogeneous, and drawing off the mixture in the form of a wet mash or pulp.

2. Method of making pulp containing asbestos fibers and cement characterized by feeding asbestos fibers into a tank containing water withdrawing a portion of the mixture of fibers and water from the tank and retaining it thereto in a stream which strikes downwardly upon the surface of the mass in the tank as such an angle that the mass is given a whirling motion and the fibers therein are shredded.

3. The method of making pulp containing asbestos and cement characterized by forming in a suitable container a mixture of asbestos fibers and water, the fibers being in complete suspension in the water, agitating such mixture, and dusting dry cement upon the surface of the mixture while continuing such agitation, the cement particles thus being first in air suspension and then in water suspension.

4. The method of making pulp containing asbestos and cement characterized by forming in a suitable container a mixture of asbestos fibers and water, the fibers being in complete suspension in the water, agitating such mixture, and dusting dry cement upon the surface of the mixture while continuing such agitation, whereby the cement particles are coated with water and intermixed homogeneously with the asbestos fibers.

5. The method of making pulp containing asbestos and cement characterized by forming in a suitable container a mixture of asbestos fibers and water, the fibers being in suspension in the water, dusting particles of dry cement in air suspension upon the surface of the mixture and agitating the cement and mixture whereby the cement particles are suspended in the water.

6. Mixer for treating asbestos and cement, comprising a tank in the shape of a cone having its tapered end downwards, the lower part of the tank communicating, by a pipe, with a pump acting to draw off the material and to eject the same downwardly at an angle against the upper surface of the material, and in a direction toward the side of the tank opposite to the side communicating with the pump, thereby creating a whirling motion of the material.

7. A mixer as claimed in claim 6 characterized by the fact that the pump is of the centrifugal type, so that the material is subjected to a beating action.

8. A mixer comprising a cone-shaped tank having its tapered end downwards, a centrifugal pump, a pipe protruding laterally near the bottom of the tank and connected with the pump, a second pipe connecting the pump with the upper part of the tank whereby liquid in the tank is drawn by the pump from the bottom and returned to the top of the tank, the second pipe terminating in a nozzle by which the returned liquid is ejected downwardly at an angle against the upper surface of the liquid in the tank, said nozzle introducing the liquid into the tank toward the side opposite the side the first mentioned pipe discharges.

Signed by me at Nashua, N. H., this 23 day of September, 1929.

ARTHUR B. SAUNDERS.